June 4, 1935.  L. KAHL  2,003,941
PROCESS FOR THE PRODUCTION OF PHENOL
Filed May 3, 1934
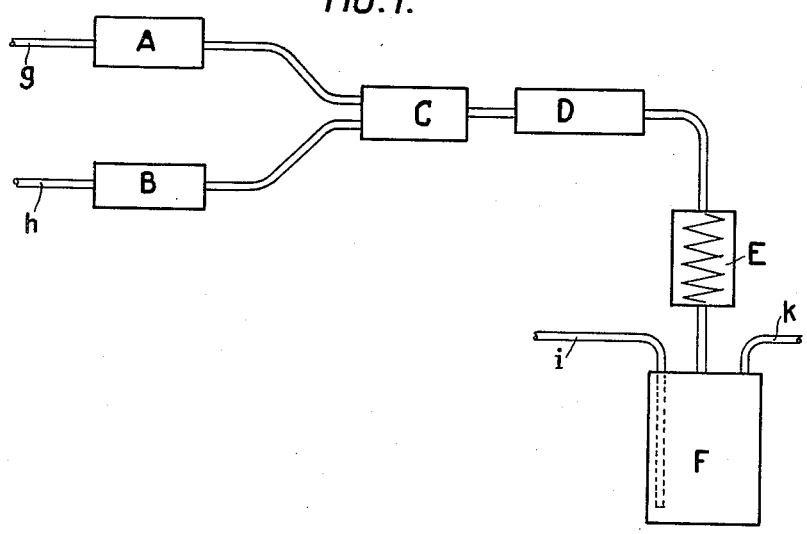
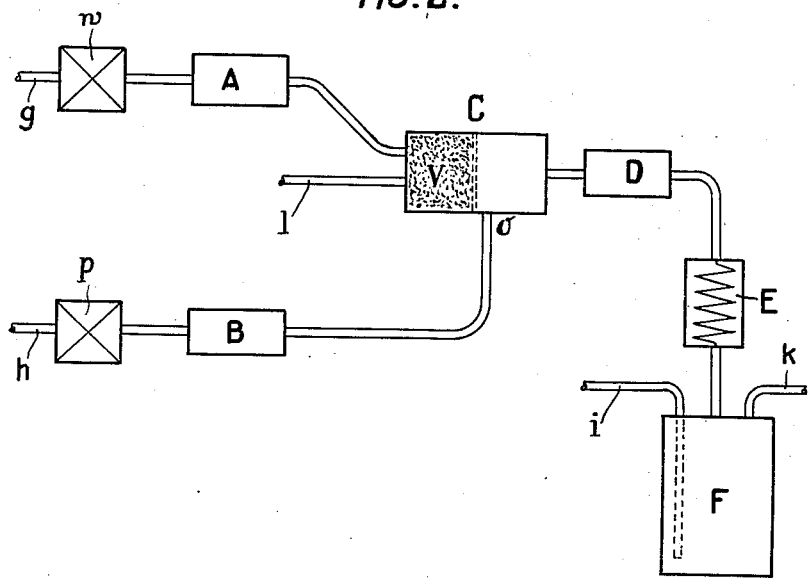
Inventor:
Leopold Kahl
BY Mock & Blum
ATTORNEYS Patented June 4, 1935

2,003,941

UNITED STATES PATENT OFFICE 2,003,941

PROCESS FOR THE PRODUCTION OF PHENOL

Leopold Kahl, Charlottenburg-Berlin, Germany, assignor to Rütgerswerke-Aktiengesellschaft, Berlin, Germany Application May 3, 1934, Serial No. 723,694
In Germany May 10, 1933

12 Claims. (Cl. 260—154)

This invention relates to a process for the production of phenol.

As a rule only about one quarter of the phenols obtainable from coal tars consist of phenol (carbolic acid) and three quarters of cresols and xylenols. Brown coal tar phenols as well as low temperature tar phenols contain scarcely appreciable quantities of phenol and consist chiefly of cresols, xylenols and other higher phenols. Since the demand for phenol was, as a rule, greater than the quantities obtainable from the tars, the need of an economical process for converting cresols into phenol was always present.

It has already been proposed to convert homologues of phenol into lower phenols by the action of hydrogen at about 400° C. or at higher temperature, at ordinary or increased pressure in the presence of a catalyst. According to another proposal, crude tar phenols are said to be converted to hydrocarbons or a lower phenol by being passed, together with superheated steam, over iron or coke at 650° C. Finally attempts have also already been made to effect the conversion of higher phenols into carbolic acid or into hydrocarbons, in the absence of catalysts by the action of hydrogen under pressure. Higher yields of phenol were not obtained by any of these processes and could also not be obtained by any of the same, since the reaction conditions therefor were not known.

During an exhaustive study of the reaction of the dealkylation of phenols it has now been found that each of the cresols requires a definite optimum temperature, at which the elimination of the alkyl group, with entry of hydrogen into the molecule, takes place. The dealkylation of o-cresol, which can be almost quantitatively converted into phenol and benzene and its homologues at temperatures as low as 550° C., is the one to be most easily effected. The reaction proceeds with greater difficulty in the case of m- and p-cresols, which require a temperature, almost 100° higher, for this conversion. A few xylenols require still higher temperatures for this reaction. The conversion of cresols, xylenols and the like to substances of lower molecular weight does not, however, proceed only in the direction of the formation of phenol, but at the same time also in another direction, viz. the elimination of the hydroxyl group from the already formed phenol or from the non-decomposed cresols and other higher phenols, with the formation of benzene, toluene or homologous hydrocarbons.

According to the present invention this undesirable formation of hydrocarbons during the production of phenol is prevented by subjecting the phenols for only a short time to the temperature favourable for the phenol formation, for example by raising the reaction mixture as rapidly as possible from the temperature range in which substantially no conversion, or only slight conversion, takes place, to the temperature favourable for the conversion of the higher phenols into phenol ($C_6H_5OH$) and then again cooling down the reaction mixture as rapidly as possible. The favourable effect of this method of operating obviously depends upon the fact that the rate of reaction of the phenol formation at the temperatures in question is substantially greater than that of the hydrocarbon formation, so that the conversion to phenol can be effected, without considerable quantities of hydrocarbons being formed. The process according to the present invention accordingly gives rise to satisfactory yields of phenol and only slight formation of benzene and homologous hydrocarbons.

It is essential for the invention that the reaction mixture is suddenly brought to the desired reaction temperature, e. g. 550–600° C. or higher and that the reaction mixture should immediately thereafter be rapidly cooled down to below the temperatures favourable to the formation of hydrocarbons.

The accompanying diagrammatic drawing illustrates two examples of apparatus suitable for carrying out the process according to this invention.

Referring to the drawing, A and B are two heating furnaces, C is the reaction vessel, D is a precooler, E is a final cooler and F is a receiver.

In carrying the process of this invention into effect, using the apparatus illustrated in Fig. 1 of the drawing, hot carbon monoxide or hot carbon monoxide-containing gases, such as coke furnace gas or illuminating gas, containing 12 to 20% of carbon monoxide, or producer gas, containing about 26% of carbon monoxide, or power gas, containing about 38% of carbon monoxide, or water gas, containing about 45% of carbon monoxide, are passed through the pipe g. The vapours of the phenols under treatment admixed with steam are passed through the pipe h. The temperatures of the two gas streams and the proportions of the phenol vapours, steam and carbon monoxide or carbon monoxide-containing gases are so selected that, when the two streams meet in the reaction vessel C, conversion of the carbon monoxide, according to the equation $$CO + H_2O = CO_2 + H_2$$

takes place and the exothermic heat of this reaction suddenly raises the reaction mixture in the vessel C to the desired temperature, at which decomposition of the phenols under treatment by the nascent hydrogen to phenol ($C_6H_5OH$) takes place. This conversion in the case of o-cresol, for example, at a temperature of 550° C. or more takes place at a considerable rate, so that it will already have proceeded sufficiently after a relatively very short time, for example one minute. When treating other phenols, a more or less high temperature is selected for the short heating treatment in the reaction vessel C, depending upon the composition of the phenols. The mixture entering the vessel D is rapidly cooled. The cooling may be effected by suitable vigorous cooling in any desired manner. Further cooling down, for example, to 20° C., takes place in the vessel E. The increase in temperature, produced by conversion of the carbon monoxide with the steam in the vessel C, depends in the first place on the carbon monoxide content of the gases and, in addition, on the size and nature of the apparatus. The carbon monoxide or carbon monoxide containing gas is suitably employed in a practically water-free condition, so that the interaction between carbon monoxide and steam does not take place prematurely on their passage to the chamber C. The steam may be introduced, not only together with the phenol vapours, but, for example, also through a nozzle or a tube l (see Fig. 2) direct into the chamber C. An alternative procedure is to introduce the phenol vapours, in admixture with carbon monoxide or carbon monoxide-containing gases, through a lead into the chamber C and to introduce the steam through the other lead. In order to obtain an about 75% conversion of the carbon monoxide with steam into carbon dioxide, about 4 vols. of steam at 100° C. are as a rule calculated per 1 vol. of carbon monoxide. Other proportions of carbon monoxide and steam may, however, also be employed. The conversion of the carbon monoxide with steam may be accelerated in all embodiments of the invention by the presence of catalysts. The output of the apparatus is substantially increased by operating under pressure. In this case a gas compressor and liquid compressor are inserted in front of g and h respectively. The liquid compressor conveys the phenols or the mixtures of substances containing the same, if desired in admixture with water, to the heater B, which in this case serves as a vaporizer and heater. The liquid and gas discharge pipes i and k, when operating under pressure, are provided with suitable closing members.

In the apparatus illustrated in Fig. 2, the operation according to the invention can be carried out by first allowing the reaction between carbon monoxide and steam to take place in a preliminary chamber V and allowing the resulting gas thereafter to react with the phenol vapours, which enter the chamber C at o. In this method of operating the heat of reaction already heats the gases in the preliminary chamber, with the result that, when the gases become mixed with the phenol vapours, the requisite rapid heating of the latter to the reaction temperature takes place. In this method of operating also care must be taken to ensure that the reaction mixture is suddenly brought to the desired reaction temperature and is only subjected thereto for a short time, so that appreciable quantities of hydrocarbons cannot be formed either before or after heating to this temperature. When operating under pressure in the apparatus shown in Fig. 2, the compressor w introduces the gas into the furnace A and the pump p conveys the phenols and water or the phenol-containing substances, for example oils and water.

The conversion of the phenols according to the invention may also be brought about in the presence of catalysts and also with other gases, for example with hydrogen or hydrogen-containing gases such as water gas, producer gas and the like. The apparatus shown in Fig. 1 may be employed when using such gases. The gases are heated to such an extent in A, that when they become mixed with the vapours to be treated in C they raise the latter suddenly to the desired temperature. When employing hydrogen or hydrogen-containing gases the operation may also be effected in the presence of steam.

As starting material to be treated according to the invention, cresols, xylenols or other higher phenols or mixtures of these compounds, for example phenol mixtures obtained from coal tar, low temperature tar, brown coal tar and the like may be employed. Instead of phenols or phenol mixtures, oils rich in these substances may also be employed such as carbolic oils, cresol oils, low temperature oils, brown coal tar oils, or, if desired, the tars themselves.

The process may be carried out intermittently or continuously. In the former case the operation is with advantage effected in a closed vessel. The substances to be converted may be repeatedly subjected to the described treatment, preferably after removing the phenol formed. The rapid heating of the higher phenols or substances containing the same and the cooling subsequent to the reaction may also be effected by any other suitable method of operation than those described hereinbefore, for example by bringing the starting material into short contact with sufficiently heated walls of a heating device through which the vapours are conducted with sufficient rapidity, or in any other manner.

I claim:

1. A process for the production of phenol ($C_6H_5OH$) from homologous phenols and hydrogen characterized by the feature that the reaction mixture is suddenly raised by hot gaseous contact to the temperature favorable for the formation of phenol and is rapidly cooled down after a short reaction period.

2. A process for the production of phenol ($C_6H_5OH$) from homologous phenols and hydrogen, according to claim 1, characterized by the feature that the reaction is carried out in presence of steam.

3. A process for the production of phenol ($C_6H_5OH$) from homologous phenols and hydrogen, according to claim 1, characterized by the feature that the reaction is carried out under raised pressure.

4. A process for the production of phenol ($C_6H_5OH$) from hydrogen and substances containing homologous phenols, characterized by the feature that the reaction mixture is suddenly raised by hot gaseous contact to the temperature favorable for the formaton of phenol and is rapidly cooled down after a short reaction period.

5. A process for the production of phenol ($C_6H_5OH$) from cresols and hydrogen, characterized by the feature that the reaction mixture is suddenly raised by hot gaseous contact to about 550–650° C. and is rapidly cooled down after a short reaction period.

6. A process for the production of phenol ($C_6H_5OH$) from cresols, according to claim 5, characterized by the feature that the rapid heating to the reaction temperature is effected by reacting preheated carbon monoxide containing gases with steam in the presence of cresol vapours.

7. A process for the production of phenol ($C_6H_5OH$) from cresols, according to claim 5, characterized by the feature that the rapid heating of the cresols to the reaction temperature is effected by mixing the cresol vapours with preheated hydrogen.

8. A process for the production of phenol ($C_6H_5OH$) from cresols, according to claim 5, characterized by the feature that the rapid heating of the cresols to the reaction temperature is effected by mixing the cresol vapours with preheated hydrogen containing gases.

9. A process for the production of phenol ($C_6H_5OH$) from substances containing cresols and hydrogen, characterized by the feature that the reaction mixture is suddenly raised by hot gaseous contact to about 550–650° C. and is rapidly cooled down after a short reaction period.

10. A process for the production of phenol ($C_6H_5OH$) from substances containing cresols, according to claim 9, characterized by the feature that the rapid heating to the reaction temperature is effected by reacting preheated carbon-monoxide-containing gases with steam in the presence of cresol-containing vapours.

11. A process for the production of phenol ($C_6H_5OH$) from substances containing cresols, according to claim 9, characterized by the feature that the rapid heating of the cresol containing substances to the reaction temperature is effected by mixing the cresol containing vapours with preheated hydrogen.

12. A process for the production of phenol ($C_6H_5OH$) from cresol containing substances, according to claim 9, characterized by the feature that the rapid heating of the cresol containing substances to the reaction temperature is effected by mixing the cresol containing vapours with preheated hydrogen containing gases.

LEOPOLD KAHL.